United States Patent Office 3,459,572
Patented Aug. 5, 1969

3,459,572
INTENSIFICATION OF LAKE COLORS
Samuel Lee, Fairlawn, N.J., assignor to Geigy Chemical Corporation, Ardsley, N.Y., a corporation of New York
No Drawing. Continuation-in-part of application Ser. No. 441,361, Mar. 19, 1965. This application Jan. 31, 1968, Ser. No. 701,879
Int. Cl. C09b 63/00
U.S. Cl. 106—289                                  8 Claims

ABSTRACT OF THE DISCLOSURE

The tinctorial strength of insoluble coloring agents is increased by incorporation into a non-bleeding lake. The lake is formed by dispersing a water insoluble color agent in a small amount of water with a water soluble anionic or non-ionic surface active agent with an HLB value of 10–25, adding a laking agent to the dispersion, drying, and reducing the dried material to a powder. The particles of the coloring agent and laking agent in the dried material are covered with a layer of the surface active agent.

---

Cross-reference to related application

This application is a continuation-in-part application of my copending application Ser. No. 441,361 filed Mar. 19, 1965, now abandoned.

This invention relates to processes for increasing the tinctorial strength of a given amount of coloring agent when prepared as a lake, and to the products so prepared. It is further concerned with superior non-bleeding lakes containing water-insoluble organic dyes.

A lake is defined by the U.S. Tariff Commission as a full strength toner or coloring agent reduced or diluted by an inert, insoluble, colorless, solid extender. Lakes are widely used in commerce instead of the toners to color a large variety of materials because they offer decided convenience factors. It is much easier to obtain and duplicate a given shade using a lake because a toner with its high tinctorial strength tends to localize and produce a specky product instead of one that is uniformly colored. The value of a toner is essentially a function of its coloring power and a procedure for obtaining greater color strength from a given amount of toner in a lake would have high commercial value. The more expensive the color, the more common it is to produce lakes and the more desirable it would be to obtain lakes of increased color strength.

Lakes are customarily manufactured by dry blending the pure toner with the colorless extender and grinding the mixture to ensure uniformity of blend and particle size. Sometimes the lakes are produced during an earlier stage in the manufacture of the color. For example, copper phthalocyanine is customarily purified by dissolving it in oleum and drowning in a large volume of water. If the oleum solution is drowned into a solution of barium chloride, a coprecipitated lake is immediately obtained, of somewhat slightly improved color strength.

It is one of the objects of the present invention to produce colored lakes with greatly improved tinctorial strengths. It is a further object to obtain lakes having greater color strength than even the best of the coprecipitated lakes. It is another object to improve the dispersibility and color uniformity of colored lakes prepared with any of a wide variety of substrates. It is a still further object to prepare these superior non-bleeding lakes in a simple and economical manner.

These and other objects are attained by thoroughly dispersing or deagglomerating the water-insoluble coloring agent in at least a small amount of water with a water-soluble anionic or non-ionic surface active agent, mixing the dispersion with a laking agent, drying the mixture under mild conditions and then reducing the dried mass to a substantially free-flowing powder. The finely divided lake so prepared is non-bleeding and shows a dramatic and unexpected increase in color strength as compared with similar lakes prepared without the aqueous deagglomeration with the water soluble anionic or non-ionic surface active agent. The process of this invention causes the insoluble color particles to become substantially completely coated with the aqueous surfactant so that, when dried, each tiny particle is covered with a layer of the dry surfactant. The surfactant further serves to prevent reagglomeration of the coloring agent in the finished lake.

The following examples illustrate the invention without limiting it to the specific details mentioned. Percentages are by weight throughout.

Example I

Copper phthalocyanine (colour index No. 74,160) presscake containing 25% blue color and 75% water _____pounds__ 40
Sodium lauryl sulfate _____do____ 2
Blanc fixe _____do____ 88

Total _____do____ 130
Anhydrous material _____do____ 100
Color content of lake _____percent__ 10

The blue presscake is agitated in a sigma blade mixer with the lauryl sulfate dispersing agent until the presscake is substantially fluid. The blanc fixe is then added and mixing is continued until a homogeneous blue paste is obtained. This mixture is placed in a tray drier and gently dried to a moisture content of 0 to 2% at a temperature of 50° C. for 24 to 48 hours. The dried cake is micropulverized and a lake is obtained which has a tinting strength of twice that of a similar lake prepared by mixing the corresponding dry ingredients and similarly micropulverizing.

Example II

Carbazole dioxazine violet presscake containing 20% color and 80% water _____pounds__ 20
N-methyl-n-acyl taurate _____do____ 2
Gloss white _____do____ 93

Total weight _____do____ 115
Anhydrous weight _____do____ 100
Color content of lake _____percent__ 5

The violet presscake is mixed with the surfactant in a dough mixer until a state of fluidity is reached. The gloss white extender is then added until a uniformly colored paste is achieved. This paste is dried in a conventional drier at 50 to 60° C. to a moisture content of 1 to 2%. The dried cake is ball-milled to a fine powder which exhibits a tinting strength substantially higher than that obtained with the corresponding dry ingredients when ball-milled in the same equipment for an equal length of time.

Example III

Quinacridone red presscake containing 30% color and 70% water _____pounds__ 100
Sodium alkyl-aryl sulfate _____do____ 15
Precipitated chalk _____do____ 55

Total weight _____do____ 170
Anhydrous weight _____do____ 100
Color content of lake _____percent__ 30

The red presscake is mixed with the alkyl-aryl sulfate using a high-speed impeller-type mixer until a free flowing liquid results. The chalk is dispersed therein to obtain a slightly viscous liquid. This liquid is spray dried to obtain a free flowing powder which, on a weight basis, has more than twice the tinctorial strength of a similar powder made when the identical ingredients are dry mixed.

Example IV

| | |
|---|---|
| Azo red prepared by coupling naphthol AS–ITR with diazotized ITR base (colour index No. 12390) containing 30% color and 70% water __pounds__ | 50 |
| Dioctyl sodium sulfosuccinate _____do____ | 3 |
| Alumina hydrate _____do____ | 82 |
| Total weight _____do____ | 135 |
| Anhydrous weight _____do____ | 100 |
| Color content of lake _____percent__ | 15 |

The Azo red presscake is well mixed with the sulfosuccinate until the toner is dispersed. Then the alumina hydrate is incorporated to form a heavy red paste. This is dried at moderate temperatures until anhydrous and the dried cake is passed through a hammer mill to produce a fine powder. A red lake is obtained which exhibits more than twice the tinting strength of a mixture of the same ingredients dry-blended and hammer-milled.

Example V

| | |
|---|---|
| Chlorinated copper phthalocyanine (colour index No. 74260) presscake containing 40% green color and 60% water _____pounds__ | 100 |
| Carboxylated naphthalene-formaldehyde condensate-sodium salt _____pounds__ | 1 |
| Lithopone _____do____ | 59 |
| Total weight _____do____ | 160 |
| Dry weight _____do____ | 100 |
| Toner content _____percent__ | 40 |

The green presscake is liquified by mixing with the naphthalene-formaldehyde condensate and the lithopone is then incorporated to produce a somewhat viscous, green fluid. This is spray dried and a green lake is obtained which has more than 50% greater tinctorial power than the same components dry mixed.

Example VI

| | |
|---|---|
| Thioindigo maroon (colour index No. 73385) presscake containing 20% color and 80% water _____pounds__ | 40.0 |
| Sodium lignin sulfonate _____do____ | 8.0 |
| Titanium dioxide _____do____ | 84.0 |
| Total weight _____do____ | 132.0 |
| Anhydrous weight _____do____ | 100.0 |
| Toner content _____percent__ | 8 |

The maroon presscake is dispersed with the lignin sulfonate and the titanium dioxide is then incorporated to form a uniformly colored paste. The paste is gently dried in a convection oven until the moisture is removed. The dried cake is reduced to a 325 mesh powder by any convenient grinding means. A maroon powder is obtained which exhibits twice the tinting strength of the same ingredients dry mixed and similarly ground.

The invention is subject to many changes with respect to the conditions used, materials treated and the like. As typical, it has been found that the quantity of water used in preparing the dispersions is not critical. From the standpoint of economy of heat required for drying, it is desirable to use no more than is adequate although an excess does no harm to the product. Many coloring agents are isolated by washing to remove uncolored salts and impurities in a filter press, resulting in a presscake containing 50 to 90% water. To avoid overburdening drying equipment, no additional water need be added. On the other hand, if a very fluid dispersion is desired for pumping through a spray drier, any convenient amount of water may be used.

The insoluble, organic coloring agents or toners used to produce the improved lakes of this invention are many and varied. Typical suitable colors include, among others, all of the water-insoluble phthalocyanine blues and greens, quinacridone reds, thioindigoid reds and violets, anthraquinone yellows, orange and blues, perinone and perylene insoluble red colors, carbazole dioxazine violets, azo- and disazo- coupled and condensation colors as well as many other well-known synthetic water-insoluble organic coloring agents.

The water soluble anionic or non-ionic surface active agents of choice are those having a hydrophile-lipophile balance (HLB) between ten and twenty-five. Examples of suitable surfactants include water soluble salts of long chain alkyl sulfuric acids, alkali metal salts of alkyl polyethoxy sulfates, alkyl-aryl sulfates and sulfonates, alkali metal acyl sarcosinates, alkyl phenoxy polyoxyethylene ($\geq 10$) ethanols, N-methyl-N-acyl taurates, alkanolamides, polyoxyethylene sorbitan oleates, dialkyl sulfosuccinates, carboxylated naphthalene-formaldehyde condensation salts, lignin sulfonates and innumerable other well-known surface active agents in this category. Surface active agents normally exhibit surface tension reduction only when dissolved in a liquid and at liquid-liquid, liquid-solid or liquid-gas interfaces. In the present invention, the dry surface active agents carried as a coating on the dry colorant particles can also exhibit surface energy effects even when not dissolved in a liquid and at solid-solid or solid-gas interfaces. This is strikingly evidenced by the increase in color strength resulting from their use as described herein.

The substrate used to produce the lake should preferably be an inexpensive, colorless material which is inert and has substantially no effect upon the end use of the lake. The most common ones are alumina hydrate and barium sulfate (blanc fixe). Sometimes they are coprecipitated as a mixture known as "gloss white." Other suitable materials include talc, clay, silica, zinc oxide, titanium dioxide, rosin, and the like. The chemical nature of these substrates has no effect upon improvement in color yield.

For most purposes, concentrations of coloring agent in the finished lake run between 5% and 15%, but this can vary with the end use of the lake. Where the lake is to be used for tinting pastel shades as little as 1% color may be specified. For heavy shades, a higher concentration of color may be required, even up to 50%. The concentration of surface active agent is usually based upon the toner content and varies somewhat from color to color. At 2% of the dry toner weight, the surface active agent used as described herein, begins to exhibit an increase in color strength. This increase reaches a maximum between 10 and 40% of the toner weight. Above 40%, the effect of the surface active agent either levels off or, in some cases, may decline slightly. Most generally, a 10–40% concentration of the surface active agent, based on the dry color content, is preferred. However, in some compositions, as much as 200% of surfactant, based on the dye, may be used. The substrate or base, comprising the remainder of the formulation, is designed to impart improved physical, optical and tinctorial properties to the lake. For transparency, insoluble powders of low refractive index, i.e. 1.45 to 1.7, are employed. Where opacity is required, high refractive index substrata are used, i.e. those with an index of 1.95 to 2.7.

The equipment for the manufacture of these lakes is generally standard in the art, for the steps of mixing, drying and grinding. A heavy duty mixer such as a pony mixer or dough mixer is usually required where a small amount of water is used, such as when the water is supplied by the filter cake. When starting with the dry color, it may be necessary to use a ball-mill or a three-roll mill, to deflocculate the color. Deflocculation and distribution of the surface-active agent and color over the base is readily apparent to the eye because of the high tinting strength of the color.

Drying should be at the lowest suitable temperatures, since more elevated temperatures may tend to case-harden the color particles and make them more difficult to distribute subsequently in the material to be colored. Tray driers operating at 50 to 60° C. or spray driers with outlet temperatures of 80 to 90° C. produce color particles that are not overheated.

The homogeneous dried mass is reduced to a free-flowing powder by putting it through conventional grinding equipment. A micropulverizer or a hammer mill with a fine screen is generally preferred. The mass may also be dry ball milled to a fine powder, or any other grinding apparatus that will serve this purpose, may be employed.

In addition to increased color value, another advantage of these new lakes is their ease of dispersibility in the substances to be colored. These lakes may be used to color soap granules, plastic particles, or any other solid, powdered material, by simple mixing, e.g., tumbling, which quickly distributes the color throughout the base with surprising uniformity which is readily apparent to the eye. The use of these lakes for coloring soap and detergent granules is especially effective since only minimum mixing produces complete distribution of the color without requiring grinding with its resultant disintegration and dust production.

Although the present invention has been described with preferred and specific embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The process of improving the tinctorial strength of a non-bleeding color lake which comprises deagglomerating a water insoluble organic color in the wet state by mixing said color with a water soluble anionic or non-ionic surface active agent, incorporating a water insoluble colorless extender into the wet mixture, drying the wet mixture so produced and grinding it, said color being present in the amount of 1–50% of the lake, and said water soluble anionic or non-ionic surface active agent being present in the amount of 2–200% of the weight of the organic color.

2. The process of improving the tinctorial strength of a color lake which comprises dispersing a water insoluble organic dye with a water soluble anionic or non-ionic surface active agent, adding a finely divided water insoluble inert extender, mixing, subjecting the mixture to mild drying and disintegrating the dried product, said dye being present in the amount of 1–50% of the lake composition and said water soluble anionic or non-ionic surface active agent being present in the amount of 2–200% of the weight of the organic dye.

3. A dry non-bleeding lake powder consisting essentially of a homogeneous mixture of finely divided particles of a water insoluble organic dye, a water soluble anionic or non-ionic surface active agent and an inert, colorless, water insoluble extender, said dye being present in the amount of 1–50% of the lake powder and said water soluble anionic or non-ionic surface active agent being present in the amount of 2–200% of the weight of the organic dye.

4. A dry non-bleeding lake powder as claimed in claim 3 in which the dye is a phthalocyanine.

5. A dry non-bleeding lake powder as claimed in claim 3 in which the dye is a quinacridone.

6. A dry non-bleeding lake powder as claimed in claim 3 in which the dye is a carbazole dioxazine insoluble color.

7. A dry non-bleeding lake powder as claimed in claim 3 in which the dye is an insoluble azo colored compound.

8. A dry non-bleeding lake powder as claimed in claim 3 in which the dye is a thioindigoid compound.

References Cited

UNITED STATES PATENTS

| 2,013,074 | 9/1935 | Siegel | 106—289 |
| 2,168,888 | 8/1939 | Siegel | 106—289 |
| 2,192,956 | 3/1940 | Sloan et al. | |
| 2,205,950 | 6/1940 | Flett | 106—289 |
| 2,772,983 | 12/1956 | Grim et al. | 106—289 |

JAMES E. POER, Primary Examiner

U.S. Cl. X.R.

106—308